United States Patent [19]

Verse

[11] 4,114,367
[45] Sep. 19, 1978

[54] LOCKING ELEMENT FOR CONNECTING CHAIN LINKS

[75] Inventor: Egon Verse, Iserlohn, Germany.

[73] Assignee: Fa. August Thiele, Iserlohn-Kalthof, Germany

[21] Appl. No.: 820,127

[22] Filed: Jul. 29, 1977

[30] Foreign Application Priority Data

Aug. 26, 1976 [DE] Fed. Rep. of Germany ....... 2638443

[51] Int. Cl.² .............................................. F16G 15/04
[52] U.S. Cl. ........................................... 59/85; 59/87
[58] Field of Search ................... 59/84, 85, 86, 87, 93, 59/78

[56] References Cited

U.S. PATENT DOCUMENTS

| 761,812 | 6/1904 | Austin | 59/85 |
| 2,052,066 | 8/1936 | Younie | 59/85 |

FOREIGN PATENT DOCUMENTS

| 1,196,028 | 7/1965 | Fed. Rep. of Germany | 59/85 |
| 1,197,291 | 7/1965 | Fed. Rep. of Germany | 59/84 |

Primary Examiner—C.W. Lanham
Assistant Examiner—Gene P. Crosby
Attorney, Agent, or Firm—Michael J. Striker

[57] ABSTRACT

A locking element for connecting two chain links is comprised of two elongated locking members each having a recess and two end portions spaced from one another. The locking members can engage one another in which position the one end portion of the one locking member engages the other end portion of the other locking member and vice versa, in one and another planes. The recesses of the locking members together form an inner circumferentially closed recess in which the chain links can move. The locking members can be disengaged from one another, in which position the chain links can be withdrawn from the inner recess. The above planes are offset relative to one another so that during movement of the locking members between the above two positions the chain links received in the respective recesses are moved in planes parallel to the above planes of the engagement of the end portions of the locking members.

13 Claims, 3 Drawing Figures

LOCKING ELEMENT FOR CONNECTING CHAIN LINKS

BACKGROUND OF THE INVENTION

The present invention relates to a locking element for connecting links of a high-tensile chain. More particularly, it relates to a locking element for connecting the chain links, which locking element has two locking members provided with engaging portions at ends thereof and connectable with one another by engagement of the respective end portions thereof.

Locking elements which connect the chain links and have two locking members engageable with one another have been proposed in the art. The known locking element has two substantially rectangular elongated locking members each having two mushroom-shaped end portions of a complementary configuration. The end portions of one of the locking members engage in and slide lengthwise of the respective end portions of the other locking member during their engagement with and disengagement from one another. In the known locking element the engaging end portions of the locking members are located in a common plane which coincides with the direction of elongation of the locking members. In such construction, during engagement and disengagement of the end portions of the locking members, that is during closing and opening of the locking element, the locking members move relative to one another in the above common plane. However, in this case they can move relative to one another for a substantially small distance until the chain links extending through an inner recess of the locking element, will interfere with and abut against one another. For this reason the length of the engaging end portions of the locking members and the cross-sectional area of the locking members in the regions of the end portions are limited to a dimension defined by a spacing of the chain and by a diameter of the chain links to be connected by the locking element. This dimension is the following:

$$L_{max.} = t - 2d,$$

wherein $L_{max.}$ — is a maximum length of the engaging end portion of the locking member;

$t$ — is a spacing of the chain; and $d$ — is a diameter of the chain link.

It is understood that the above limitation constitutes an essential disadvantage of the known locking member.

SUMMARY OF THE INVENTION

Accordingly, it is an object of the present invention to provide a locking element for connecting two chain links with one another, which avoids the disadvantages of the prior art locking elements.

More particularly, it is an object of the present invention to provide a locking element for connecting two chain links with one another, which can be closed and opened substantially without interference of the chain links extending through an inner recess of the locking element with one another, during the above closing and opening of the locking element.

Another object of the present invention is to provide a locking element for connecting two chain links with one another, whose locking members have engaging end portions of such a length which exceeds the length of the engaging end portions of the known locking members.

In keeping with these objects, and with others which will become apparent hereinafter, one feature of the present invention resides, briefly stated, in a locking element which has two elongated locking members each having one and another end portions engaging in the another and one end portions of the other locking member in one and another plane, which planes are so offset relative to each other that during movement of the locking members between an engaged and a disengaged position chain links received in an inner recess of the locking element move in a plane substantially parallel to the above-mentioned planes.

In this construction the length of the engaging end portions and the cross-sectional area of the locking members in the regions of the end portions are not limited by the diameter of the chain links and the spacing of the chain. The engaging end portions may be made of a dimension which is sufficiently large and exceeds the cross-sectional area of the chain links. It is possible to so construct the locking element that its safety factor reaches the safety factor of the chain, and that the strength of the material and the tension resistance of the locking element correspond to those of the chain. The locking member of the present invention can withstand the same number of stressing cycles as the chain, and therefore has the same life time as the latter.

Another feature of the present invention is that the engaging end portions of the respective locking members are formed as interengaging mushroom-shaped projections and grooves which have the same length and are inclined at the same angle relative to the direction of elongation of the locking members. It is especially advantageous when the interengaging projections and grooves are inclined to the direction of elongation of the locking element at an angle equal to substantially between 15° and 25°, preferably at an angle of 20°. This provides for an especially favorable engagement of the locking members with each other.

Still other features of the present invention are that the locking members may be identical to each other, the projections and the grooves of the end portions thereof have a complementary configuration, the grooves are open towards the respective projections, and the projections are insertable into the grooves until the former abut against wall projections bounding end portions of the latter. The planes in which the end portions of the locking members engage each other may be spaced from one another in the direction of elongation of the locking members, and offset from one another in a direction transverse to the above direction of elongation or transverse to the direction of movement of the locking members between the engaged and the disengaged position.

The other features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
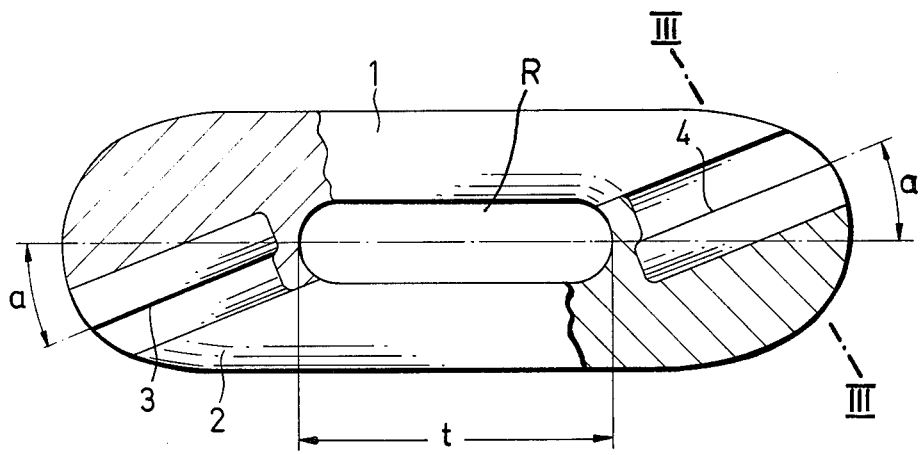
FIG. 1 is a partially sectioned side view of a locking element in accordance with the present invention, showing locking members in an engaged position, that is in the position in which they together form the closed locking element.

As shown in the drawing, a locking element for connecting two chain links with each other in accordance with the present invention, consists of two locking members 1 and 2 connectable with one another. The locking members 1 and 2 are identical to one another and each have two ends 1a, 1b and 2a, 2b, respectively. Engaging portions 3 and 4 are formed at the respective ends of the locking members 1 and 2 and spaced from one another in the direction of elongation of the locking members, that is, in the direction of elongation of the locking element itself. The engaging portions located at one end of each locking member, such as the engaging portions located at the ends 1a and 2a, are formed as mushroom-shaped projections 6 and 5, whereas the engaging portion located at the other ends, such as located at the ends 1b and 2b, are formed as grooves 7 and 8, each having a configuration complementary to the configuration of the respective projection.

Each locking member 1 or 2 has a recess $R_1$ or $R_2$, respectively, which together form an inner recess R of the locking element when the locking members 1 and 2 are connected with one another as shown in FIG. 1. Chain links 9 and 10 which must be connected with one another extend through the thus-formed inner recess R. A spacing "t" of the locking element which corresponds to the length of the inner recess R thereof has such a dimension that two chain links 9 and 10, each having a diameter "d" can be inserted in the inner recess R, and the chain links do not hinder the movement of the locking members 1 and 2 relative to one another during closing and opening of the locking element.

Figure 3:
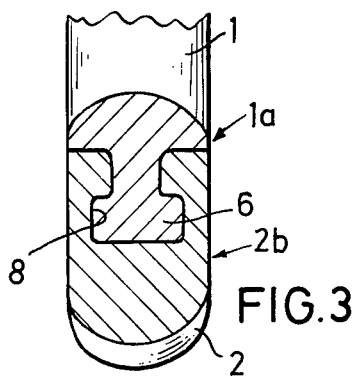
FIG. 3 is a section of a locking element taken along the line III—III of FIG. 1.
Figure 2:
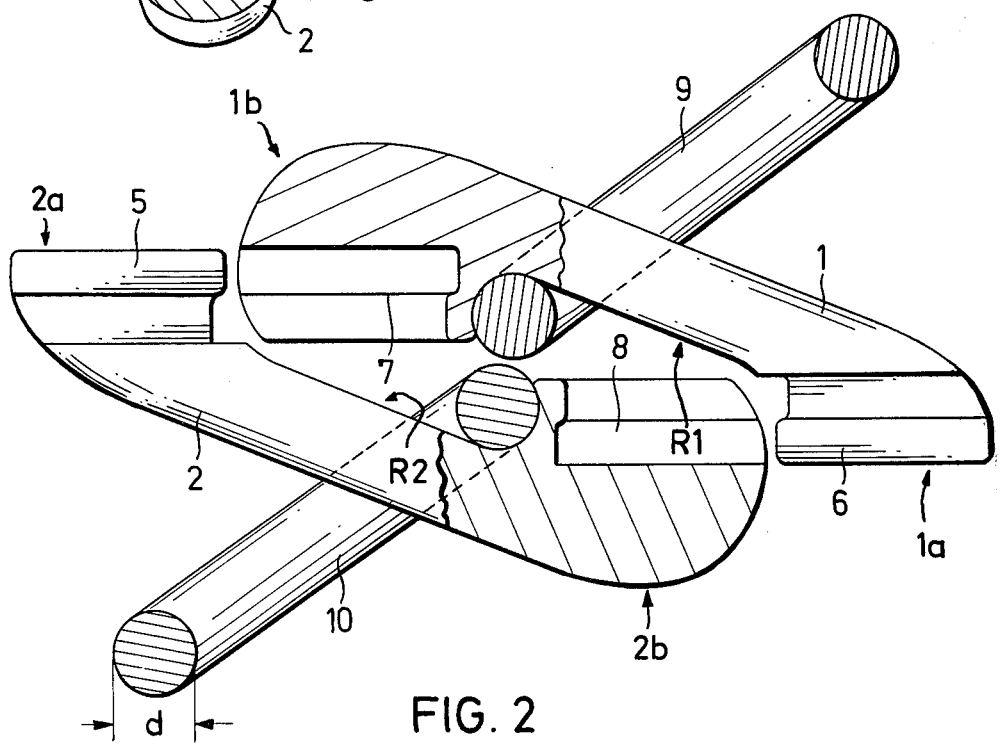
FIG. 2 is a partially sectioned view of a locking element in accordance with the present invention, showing locking members in a disengaged position and two chain links to be connected by the locking element, wherein the locking members are shown as starting their movement into the engaged position thereof.

The grooves 7 and 8 each have an open end facing towards the respective projections 5 and 6, and a closed end spaced from the above open end in the direction of elongation of the respective groove. As shown in FIG. 3, a bottom portion of each groove 7 and 8 has a width exceeding the width of a top portion of the groove. The projections 5 and 6 engage in the respective grooves 7 and 8 in planes which are spaced from one another in the direction of elongation of the locking members and are parallel to one another. As clearly shown in FIG. 2, the above planes are inclined relative to the direction of elongation of the locking element at an angle "α" which is equal to substantially between 15° and 25°, preferably equal to 20°. The length of the projection and the angle of inclination thereof corresponds to those of the grooves.

For the closing of the locking element and for thereby connecting the chain links 9 and 10 with one another, the locking members 1 and 2 are moved relative to one another in the direction of elongation of the projections and grooves into engaged position. The projections 5 and 6 engage the respective grooves 7 and 8 and slide lengthwise of the latter until the projections abut against the wall portions bounding the end portions of the grooves. As clearly seen in FIG. 2, the chain links 9 and 10 to be connected with one another move in planes which are parallel to the planes of the engagement of the projections with the grooves. During such movement the chain links 9 and 10 do not interfere with one another.

The opening of the locking element is performed in the reverse order, and during the opening the chain links also move relative to one another in planes parallel to the above planes of the engagement and do not interfere with one another.

It will be understood that each of the elements described above, or two or more together, may also find a useful application in other types of constructions differing from the types described above.

While the invention has been illustrated and described as embodied in a locking element for connecting chain links, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A locking element for connecting two chain links with one another, comprising two elongated locking members each having a recess and one and another end portion which are spaced from each other, the one end portion of one of said locking members being slidably and releasably engageable with the other end portion of the other locking member, and vice versa, in one and another plane which are parallel to one another and are inclined lengthwise of but in an oblique direction relative to the elongation of said locking members, said locking members being slidably movable relative to one another in said oblique direction between an engaged position in which the one end portion of one of said locking members engages the other end portion of the other of said locking members, and vice versa, in said one and other plane, respectively, and the recesses of said locking members together form an inner circumferentially closed recess in which the chain links can move, and a disengaged position in which the respective end portions of the locking members are disengaged from each other so that the chain links can be withdrawn from said inner recess, said one and said other plane being so offset relative to one another that during sliding movement of said locking members between said positions chain links received in the respective recesses thereof are moved in planes substantially parallel to said one and said other plane.

2. The locking element as defined in claim 1, wherein said two locking members are identical to one another.

3. The locking element as defined in claim 1, wherein said one and other planes are spaced from one another in the direction of elongation of said locking members.

4. The locking element as defined in claim 1, wherein said one and other planes are offset from one another in a direction substantially transverse to said oblique direction.

5. The locking elements as defined in claim 1, wherein the end portions of one of said locking members have a configuration which is complementary to the configuration of the end portions of the other locking element.

6. The locking element as defined in claim 5, wherein one of said end portions of each of said locking members has a projection whereas the other end portion of the same locking member has a groove so that the projection and the groove of one of said locking members are slidably engageable with the groove and the projection of the other locking element, respectively.

7. The locking element as defined in claim 6, wherein said projections are mushroom-shaped.

8. The locking element as defined in claim 6, wherein the groove of the respective end of one of said locking members is open towards the projection of the adjacent end of the other locking member.

9. The locking element as defined in claim 6, wherein said projections each have a length corresponding to the length of each of said grooves.

10. A locking element for connecting two chain links with one another, comprising two elongated locking members each having a recess and one and another end portion which are spaced from each other, one of said end portions of each of said locking members having a projection whereas the other end portion of the same locking member has a groove shaped complementarily to said projection, the projection and the groove of one of said locking members being slidably engageable with the groove and the projection of the other locking element, respectively, so that said locking members are movable relative to one another between an engaged position in which the one end portion of one of said locking members engages the other end portion of the other of said locking members, and vice versa, in one and another plane, respectively, and the recesses of said locking members together form an inner circumferentially closed recess, in which the chain links can move, and a disengaged position in which the respective end portions of the locking members are disengaged from each other so that the chain links can be withdrawn from said inner recess, said one and said other plane being so offset relative to one another that during movement of said locking members between said positions chain links received in the respective recesses thereof are moved in planes substantially parallel to said one and said other plane, each of said grooves of said locking members having a closed end portion, each of said locking members having a wall portion bounding the closed end portion of the respective groove, the projections of the locking members being insertable into the grooves thereof until the former abut against the wall portions bounding the end portions of the respective grooves.

11. A locking element for connecting two chain links with one another, comprising two elongated locking members each having a recess and one and another end portion which are spaced from each other, one of said end portions of each of said locking members having a projection whereas the other end portion of the same locking member has a groove shaped supplementarily to said projection, the projection and the groove of one of said locking members being slidably engageable with the groove and the projection of the other locking element, respectively, so that said locking members being movable relative to one another between an engaged position in which the one end portion of one of said locking members engages the other end portion of the other of said locking members, and vice versa, in one and another plane, respectively, and the recesses of said locking members together form an inner circumferentially closed recess in which the chain links can move, and a disengaged position in which the respective end portions of the locking members are disengaged from each other so that the chain links can be withdrawn from said inner recess, said one and said other plane being so offset relative to one another that during movement of said locking members between said positions chain links received in the respective recesses thereof are moved in planes substantially parallel to said one and said other plane, said grooves and said projections of said locking members being inclined relative to the direction of elongation of the latter at an angle equal to substantially between 15° and 25°.

12. The locking element as defined in claim 11, wherein said grooves and said projections are inclined relative to the direction of elongation of said locking members at an angle equal to substantially 20°.

13. A locking element for connecting two chain links with one another, comprising two elongated locking members each having a recess and one and another end portion which are spaced from each other, one of said end portions of each of said locking members having a projection whereas the other end portion of the same locking member has a groove shaped supplementarily to said projection, the projection and the groove of one of said locking members being slidably engageable with the groove and the projection of the other locking element, respectively, so that said locking members being movable relative to one another between an engaged position in which the one end portion of one of said locking members engages the other end portion of the other of said locking members, and vice versa, in one and another plane, respectively, and the recesses of said locking members together form an inner circumferentially closed recess in which the chain links can move, and a disengaged position in which the respective end portions of the locking members are disengaged from each other so that the chain links can be withdrawn from said inner recess, said one and said other plane being so offset relative to one another that during movement of said locking members between said positions chain links received in the respective recesses thereof are moved in planes substantially parallel to said one and said other plane, each of said grooves having a bottom portion and a top portion, said bottom portion of said groove having a width exceeding the width of said top portion thereof.

* * * * *